United States Patent Office 3,159,543
Patented Dec. 1, 1964

3,159,543
3-CYCLOPENTYL AND CYCLOPENTENYL ETHERS OF ESTRONE AND DERIVATIVES THEREOF
Alberto Ercoli, Milan, Italy, assignor to Francesco Vismara S.p.A., Casatenovo, Como, Italy, a corporation of Italy
No Drawing. Continuation of application Ser. No. 111,178, May 19, 1961. This application July 30, 1963, Ser. No. 298,541
Claims priority, application Italy, Apr. 7, 1961, 6,449/61
16 Claims. (Cl. 167—74)

This invention relates to new derivatives of estrogen hormones and is more particularly concerned with novel five-membered cyclic ethers of derivatives of 1,3,5-estratriene-3-ol having an oxygen function at $C_{17}$. Exemplary of the new compounds of this invention are the cyclopentyl ethers of 3-hydroxy-17-keto estratriene (estrone), of 3,16α,17β-trihydroxy estratriene (estriol), of 3,16α,17α-trihydroxy-estratriene (epiestriol), of 3,17β-dihydroxy-estratriene (estradiol), of the 17α-lower alkyl and ethynyl derivatives of estradiol and of the 17β-acyl esters of estradiol and its 17α-lower alkyl and ethynyl derivatives.

It is an object of the present invention to provide new chemical compounds having a significant estrogenic activity. Another object of the invention is to provide pharmaceutical compositions containing the new compounds and a further object of the invention is to provide a method of carrying out estrogenic therapy in women employing these compositions.

The new compounds of this invention can be represented by one of the structural formulas:

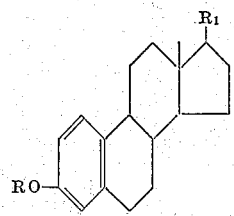

where $R_1$ represents a ketonic oxygen (=O), a β-hydroxy group, a β-acyloxy group derived from a hydrocarbon monocarboxylic acid, particularly an alkanoic acid containing 1 to 4 carbon atoms, a β-hydroxy α-ethynyl grouping

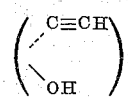

a β-acyloxy α-ethynyl grouping in which the acyloxy group is derived from a hydrocarbon monocarboxylic acid, particularly in alkanoic acid containing 1 to 4 carbon atoms, a β-hydroxy α-lower alkyl grouping in which the lower alkyl group preferably contains from 1 to 3 carbon atoms or a β-acyloxy α-lower alkyl grouping in which the acyloxy group is derived from a hydrocarbon monocarboxylic acid, particularly an alkanoic acid containing 1 to 4 carbon atoms and the lower alkyl group preferably contains from 1 to 3 carbon atoms, and R represents a cyclic hydrocarbon radical containing five carbon atoms, or

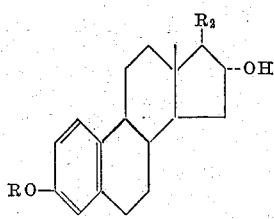

where $R_2$ represents a ketonic oxygen (=O) or an α or β-hydroxy group and R has the same meaning as above. It is preferred that R represent a cyclopentyl radical of the structure,

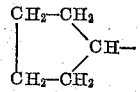

but it is to be understood that compounds in which there is unsaturation in the five carbon ring are included in the invention.

The compounds of this invention are physiologically active agents possessing, when administered orally, an exceptional estrogenic activity by far superior to that of the corresponding free 3-hydroxy steroids.

Certain monoether derivatives of estrogens are already known, but none of the prior art compounds show an adequate potency by oral route. We have found that the new five membered cyclic ethers, of natural and synthetic estrogens, exhibit a higher degree of oral activity and a superior therapeutic ratio when compared with the corresponding free 3-hydroxy steriods.

The estrogenic potency possessed by this new series of derivatives has been determined in comparison with the parent steroids and same of their corresponding lower alkyl ethers on the uterotrophic activity test according to the technique of Rubin et al. (Endocrinology 49, 429, 1951), employing immature female mice, 20-23 days old, previously randomized. The tested compounds, dissolved in 0.2 ml. of sesame oil, were given orally once daily for three consecutive days, with autopsy on the morning of the fourth day.

The initial and final body weights, and the uterus weight, have served as end-points.

In Table I are summarized the results of these investigations, giving the uterotrophic activity of representative cyclopentyl ethers of this invention, and some of the corresponding lower alkyl and aralkyl ethers, taking as 1 the potency of the parent steroid.

TABLE I

| Compound: | Relative uterotrophic potencies |
|---|---|
| Estrone | 1 |
|    3-propyl ether | 0.6 |
|    -butyl ether | 1.5 |
|    -benzyl ether | 0.5 |
|    -cyclopentyl ether | 15 |
| Estriol | 1 |
|    3-butyl ether | 1.2 |
|    -cyclopentyl ether | 25 |
| Epi-estriol | 1 |
|    3-cyclopentyl ether | 20 |
| Estradiol | 1 |
|    3-butyl ether | 1 |
|    -benzyl ether | 0.3 |
|    -cyclopentyl ether | 10 |
| 17α-methyl estradiol | 1 |
|    3-cyclopentyl ether | 15 |
| 17α-ethynyl estradiol | 1 |
|    3-methyl ether | 0.3 |
|    -cyclopentyl ether | 3 |

The new cyclopentyl ethers of this invention show an exceptional increase in the estrogenic oral activity. In particular the cyclopentyl ethers of 17α-methyl and 17α-ethynyl estradiol appear to be fifteen and three times, respectively, more active than the parent steroids, which have been considered till now the most potent estrogens on oral administration.

The cyclopentyl ethers of estriol and epi-estriol are also effective when given by parenteral route and they show by this route an effectiveness about twenty times greater than the corresponding parent hormones.

The new cyclopentyl ether derivatives of this invention, which possess a marked intrinsic estrogenic activity, are of practical value, especially by oral administration, because they permit an oral treatment with low dosages.

Such compounds can be given orally in association with a suitable pharmaceutical carrier which is not incompatible with the active substance. The carrier can be solid or liquid and can be chosen among those usually employed in pharmaceutical techniques for manufacturing preparations suitable for oral ingestion. According to the nature of the carrier, the compositions will be in solid or liquid form. In the first case they may take the form of pills, tablets, sweets, capsules, etc., and in the second case, they may take the form of syrup or suspensions. If desired, the liquid preparations may be contained in capsules of gelatin or other material soluble or disintegrateable in the alimentary tract. As acceptable carriers, there can be used oils, which are liquid, or fats or butteers, which are solid or semi-solid at ordinary atmospheric temperatures.

A suitable way to administer the pentyl ethers of estrogen hormones is to give them orally dissolved in a fluid vehicle, such as a vegetable oil or an orally-acceptable alcohol or glycol, sufficient of the vehicle being present to dissolve and carry the active substances.

In the compositions of this invention, the new compounds are present in an amount sufficient to produce therapeutic effects. In general, the amount is from about 0.001 mg. to about 10 mg., preferably from about 0.01 mg. to about 5 mg. per dosage unit.

The method of this invention comprises orally administering the new compounds to humans, in an amount sufficient to produce therapeutic effects, in admixture with a non-toxic pharmaceutical carrier as exemplified above. The daily dosage of the 3-ethers will be in an amount of from about 0.001 mg. to about 30 mg. and preferably from about 0.01 mg. to about 10 mg. The administration is by the oral route, in equal doses, one to three times daily.

The new compounds of this invention may be also administered orally in association with other therapeutically useful substances, such as, for example, enol ethers of androgenic and/or progestational hormones. The enol ethers of androgenic hormones include preferably hexyl and cyclopentyl enol ether of 17α-methyl-testosterone and the enol ethers of progestational hormones may be selected from the cyclopentyl enol ethers of progesterone, 17α-acetoxy progesterone and 17α-ethynyl 19-nortestosterone acetate.

Preparation and use of the composition of this invention comprising, in combination with the cyclopentyl ethers of estrogen hormones, one or more of the enol ethers said above, are illustrated in the examples.

The new compounds of this invention can be obtained by methods already known for the preparation of other ethers. The cyclopentyl ether of estrone can be easily prepared by reacting 3-hydroxy-17-keto-estratriene or its sodium salt with the cyclopentyl halide, for instance bromide or chloride, in the presence of a suitable condensing agent and thereafter recovering the desired ether from the mixture of reaction products. As condensing agent, an alkaline hydroxide or carbonate or alcoholate can be employed. The same procedure can be followed for the preparation of cyclopentyl ethers of estriol and epiestriol.

The preparation of the cyclopentyl monoethers of 3,17-dihydroxy-estratriene can be carried out either directly by submitting the diol to partial etherification, or indirectly by first preparing the cyclopentyl monoether of the corresponding 3-hydroxy-17-keto-estratriene and then transforming the 17-keto group into a hydroxy group by normal reduction methods. The same procedure can be followed for the preparation of the cyclopentyl monoethers of 17α-substituted 3,17β-dihydroxy estratriene. For instance, the 3-cyclopentyl ether of 17α-ethynyl estradiol can be prepared either by partial etherification of the 17α-ethynyl-estradiol, itself, or by direct ethynylation with potassium acetylide of the corresponding cyclopentyl ether of estrone, according to known methods.

Other procedures for the preparation of the new cyclopentyl ethers of this invention are given in the following examples which show also the preparation of equivalent cyclopentenyl ethers of derivatives of 1,3,5-estratriene-3-ol by substituting for instance, 3-cyclopentenyl chloride for cyclopentyl chloride.

*Example 1*

A mixture of 1 g. of estrone and 1 g. of cyclopentyl bromide is added slowly to a solution of sodium ethylate, obtained from 0.1 g. of sodium and 8 cc. of absolute ethanol. The reaction mixture is heated to reflux for 4 hours, then ethyl alcohol is eliminated by distillation and the residue treated with a little water. A precipitate is obtained consisting of cyclopentyl ether of estrone which, after recrystallization from a mixture of methylene chloride-methanol, melts at 149–150° C.; $[\alpha]_D = +136°$ (0.5% in dioxane).

*Example 2*

0.2 g. of potassium hydroxide are dissolved in 10 cc. of absolute ethanol and to the solution is added slowly a mixture of 1.2 g. of estradiol and 1 g. of cyclopentyl chloride. After heating to reflux for three hours, the solvent is evaporated, and the residue treated with water, thus obtaining 1.5 g. of a product which, filtered, washed with a little water and dried, melts as 109° C. After recrystallization from methanol, 1.1 g. of estradiol 3-cyclopentyl ether is obtained at M.P. 116–118.5° C.; $[\alpha]_D = +63.5° \pm 1$ (0.5% in dioxane).

0.5 g. of this ether dissolved in 4 cc. of anhydrous pyridine are treated with 2 cc. of propionic anhydride. The mixture is allowed to stand for approximately 15 hours, then poured into water, causing a solid to precipitate. The product is collected, washed and dried to give 0.45 g. of estradiol 17-propionate 3-cyclopentyl ether which, after recrystallization from methanol, melts at 101–102° C.; $[\alpha]_D = +41°$ (0.5% in dioxane).

*Example 3*

To a suspension of 2 g. of estrone cyclopentyl ether in 50 cc. of ethanol are added 0.2 g. of sodium borohydride in 3 cc. of water soultion. This mixture is stirred for about 6 hours at room temperature, then treated with 10 cc. of acetic acid and diluted with water up to complete precipitation. The product filtered and dried, consists of 3-cyclopentyl ether of estradiol melting at 110° C.

*Example 4*

A solution of 1.5 g. of 17α-ethynyl estradiol in 50 cc. of absolute ethanol is added slowly to a mixture of 3 g. of cyclopentyl bromide and 2 g. of potassium carbonte. This mixture is heated to reflux and stirred for three hours, then filtered. Most of the alcohol is eliminated by distillation and the resulting solution diluted with water, and cooled in an ice-bath. The product which precipitates is collected by filtration, washed and dried. After recrystallization from methanol the 3-cyclopentyl ether of 17α-ethynyl estradiol shows melting point 107–108° C.

*Example 5*

A solution of potassium ter-amylate obtained from 2 g. of potassium and 40 cc. of tertiary amyl alcohol, is saturated with acetylene, 2 g. of estrone cyclopentyl ether in 50 cc. of anhydrous toluene solution are added and addition of acetylene is continued for ten hours at a temperature of about 20° C.

The reaction mixture is then treated with 100 cc. of an aqueous solution of 10% ammonium chloride, the organic layer separted, washed with water, dried over anyhdrous sodium carbonate and evaporated to dryness to give 1.7 g. of a crude product, which recrystallized from methanol, melts at 106–107° C. The melting point is undepressed on admixture with a specimen of 3-cyclopentyl ether of 17α-ethynyl estradiol obtained as in Example 4.

This compound (1 g.) is treated with 4 cc. of propionic anhydride in pyridine solution as in Example 2 to give 17β-propionate of 17α-ethynyl estradiol 3-cyclopentyl ether.

Example 6

A mixture of 1.5 g. of estriol and 1.5 g. of cyclopentyl bromide in 20 cc. of sodium ethylate solution, containing 0.2 g. of sodium, is refluxed for three hours, then ethyl alcohol is eliminated by distillation and the residue decomposed with a little water to give 1.7 g. of estriol 3-cyclopentyl ether, M.P. 161–162° C.; $[\alpha]_D = +46°$ (dioxane).

Example 7

To 1.1 g. of estrone there are added 35 cc. of absolute methanol, 1.9 g. of 3-cyclopentyl chloride and 1.6 g. of potassium carbonate. The mixture is refluxed for two hours under nitrogen atmosphere and absolutely anhydrous conditions, then cooled and filtered from the potassium salt which separates.

The solvent is eliminated and the residue recrystallized from anyhydrous methanol to give cyclopentenyl ether of estrone.

Example 8

By treating 1 g. of 17-epiestriol with 1 cc. of cyclopentyl bromide in a sodium ethylate solution as in Example 1, 17-epiestriol 3-cyclopentylether is obtained melting, after recrystallization from hexane, at 114–115° C.; $[\alpha]_D = +40°$ (dioxane).

Example 9

A mixture of 1 g. of 17α-methylestradiol and 1 cc. of cyclopentyl bromide is added to a solution of sodium ethylate obtained from 0.1 g. of sodium and 15 cc. of absolute ethanol. The reaction mixture is heated to reflux for 4 hours, then partially concentrated under vacuum after addition of a little water.

A precipitate is obtained consisting of 3-cyclopentyl ether of 17α-methylestradiol which, after recrystallization from hexane, melts at 107–108° C.; $[\alpha]_D = +45°$ (dioxane).

Example 10

A solution of 1 g. of estrone 3-cyclopentyl ether in 10 cc. of anhydrous tetrahydrofuran is added to an ethereal solution of methylmagnesium bromide obtained from 2 g. of magnesium and 25 g. of methyl bromide. The reaction mixture is heated to reflux for 2 hours and then allowed to stand overnight at room temperature. The mixture is then treated with an aqueous solution of 30% ammonium chloride. The organic layers are separated, washed with water, dried over anhydrous sodium carbonate and evaporated to dryness to give 17α-methylestradiol 3-cyclopentyl ether.

The compound (0.5 g.) is treated with propionic anhydride and pyridine and converted into 17β-propionate of 17α-methyl estradiol 3-cyclopentyl ether.

Example 11

1 g. of cyclopentyl ether of estradiol dissolved in 5 cc. of anhydrous pyridine, is refluxed for about one hour with 2 g. of acetic anhydride. After cooling, the mixture is diluted with water causing the precipitation of a product which is collected by filtration, dried and recrystallized from methanol, thus obtaining the 3-cyclopentyl ether of estradiol 17β-acetate.

Similarly, estradiol cyclopentyl ether is esterified with isobutyric anhydride and pyridine to give estradiol 17β-isobutyrate 3-cyclopentyl ether.

Example 12

A mixture of 1.3 g. of 17α-ethynyl estradiol, 30 cc. of absolute methanol and 2.2 g. of potassium carbonate is treated with 3.5 g. of cyclopentenyl chloride (obtained by chlorination of cyclopentanone with phosphorus pentachloride). The reaction mixture worked up as in Example 7 yields cyclopentenyl ether of 17α-ethynyl estradiol.

Example 13

1 g. of cyclopentyl ether of estrone is dissolved in 20 cc. of tetrahydrofuran. To the resulting solution there is added 0.1 g. of sodium borohydride in 5 cc. of water solution and the mixture is stirred for some minutes, at room temperature (about 20° C.), then heated at reflux for about one hour.

After cooling, a little water is poured into the reaction flask up to complete precipitation of the cyclopentyl ether.

500 mg. of this product are dissolved in 3 cc. of 99% formic acid and to the resulting solution 25 mg. of p-toluenesulfonic acid are added. The mixture is stirred vigorously for a few minutes, then allowed to stand for about fifteen hours at a temperature of about 15° C. After addition of water, a precipitate is obtained of estradiol 17β-formate-3-cyclopentyl ether. Yield 65% of the theoretical amount.

Example 14

17α-ethylestradiol (0.5 g.) is treated with 0.6 cc. of cyclopentyl bromide in 8 cc. of sodium ethylate solution, as described in Example 9, to give 3-cyclopentyl ether of 17α-ethylestradiol.

This material (0.02 mg.) is mixed with 10 mg. of lactose and filled into gelatine capsules which are administered orally one or two times daily. The capsules are used clinically for relief of the menopausal symptoms and in secondary amenorrhea.

Example 15

Tablets for oral use, each containing 0.1 mg. of estradiol 3-cyclopentyl ether, are prepared from the following components:

| | |
|---|---|
| Cyclopentyl ether of estradiol _____mg__ | 100 |
| Placebo granules _____g__ | 40 |
| Talc _____g__ | 5 |
| Calcium stearate _____g__ | 5 |

The placebo granules are made of 60% lactose and 40% of rich starch. The finely powdered cyclopentyl ether of estradiol is added and the adjuvants talc and calcium stearate are added. Tableting is done on a rotary machine.

Example 16

50 mg. of 3-cyclopentyl ether of 17α-ethynyl estradiol, ground to a fine powder, are dissolved in one liter mixture (1:1) of sesame oil and olive oil. The limpid and homogeneous solution is introduced into 0.2 cc. gelatin capsules, so that each capsule contains exactly 0.01 mg. of 3-cyclopentyl ether of 17α-ethynyl estradiol.

The capsules provide a stable pharmaceutical composition for oral use, very effective in the treatment of ovarian deficiencies.

Example 17

Gelatin capsules, each containing 0.1 mg. of cyclopentyl ether of estriol in 0.2 cc. of sesame oil solution, are prepared in the usual manner and used clinically in the treatment of senile vaginitis, kraurosis vulvae and leukoplakia with good results.

Example 18

3-cyclopentyl ether of estrone (210 mg.) are dissolved in 210 cc. of sesame oil and the solution is poured in 3 cc.

ampoules, so that each ampoule contains 1 mg./cc. of the active substance. Such an oil composition, which is of proper dosage, is suitable for oral ingestion when administered dropwise.

*Example 19*

In the same manner as in the preceding examples, liquid compositions for oral use, containing 3-cyclopentyl ether of epiestriol, estradiol, 17α-methyl and ethyl estradiol are prepared by using sesame oil, olive oil or other vegetable oil, singly or in admixture as liquid carriers.

*Example 20*

Gelatin capsules, each containing 5 mg. of 3-cyclopentyl enolether of 17α-methyltestosterone and 0.2 mg. of cyclopentyl ether of estradiol in 0.5 cc. of sesame oil, are prepared by dissolving the active ingredients in a calculated amount of the oil and then encapsulating the solution in the usual manner.

The capsules are used clinically for inhibition and suppression of lactation, at a dose of two to three capsules daily.

In the same manner as above, hard gelatin capsules are prepared each containing 6 mg. of 3-hexyl enolether of 17α-methyltestosterone and 0.2 mg. of 3-cyclopentyl ether of estradiol.

*Example 21*

As in the preceding examples, a sesame oil solution, containing in each cc. 15 mg. of 3-cyclopentyl enolether of 17-acetoxy progesterone and 0.05 mg. of 3-cyclopentyl ether of 17α-ethynyl estradiol is prepared and filled into soft gelatin capsules. Good results have been obtained in the induction of regular cyclic bleeding in amenorrheic women, giving one or two capsules daily.

*Example 22*

An oily composition suitable for oral administration, comprising one androgenic, one estrogenic and one progestinic substance, is prepared by dissolving in a mixture of sesame oil and olive oil 3-n-hexyl enolether of 17α-methyltestosterone (15 mg./cc.), 3-cyclopentyl enolether of progesterone (20 mg./cc.) and 3-cyclopentyl ether of 17α-ethynyl estradiol (0.05 mg./cc.).

The solution is then encapsulated in the usual manner and the capsules used clinically for the treatment of profuse vaginal bleeding during or after the menopausa, at a dose of two capsules daily.

This application is a continuation of my U.S. application Serial No. 111,178, filed May 19, 1961, now abandoned, which is, in turn, a continuation-in-part to my U.S. application Serial No. 26,714, filed on May 4, 1960, now abandoned.

I claim:

1. A steroid compound selected from the group consisting of a compound having the formula:

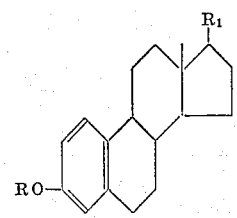

where $R_1$ is selected from the group consisting of a keto group, a β-hydroxy group, a β-acyloxy group derived from a lower alkanoic acid, a β-hydroxy α-alkyl grouping in which the alkyl group contains from one to three carbon atoms, a β-acyloxy α-alkyl grouping in which the acyloxy group is derived from a lower alkanoic acid and the alkyl group contains from one to three carbon atoms, a β-hydroxy α-ethynyl grouping, a β-acyloxy α-ethynyl grouping in which the acyloxy group is derived from a lower alkanoic acid and R is a member selected from the group consisting of cyclopentyl and cyclopentenyl radicals, and a compound having the formula

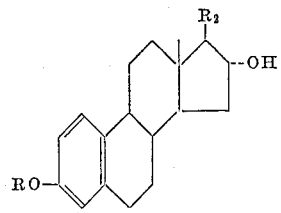

where R has the same meaning as above, and $R_2$ is selected from the group consisting of α- and β-hydroxy groups.

2. 3-cyclopentyl ether of estrone.
3. 3-cyclopentyl ether of estriol.
4. 3-cyclopentyl ether of epi-estriol.
5. 3-cyclopentyl ether of estradiol.
6. 3-cyclopentyl ether of 17α-methyl estradiol.
7. 3-cyclopentyl ether of 17α-ethynyl estradiol.

8. A pharmaceutical composition in dosage unit form for oral administration comprising in admixture with a pharmaceutically acceptable carrier, from 0.001 mg. to 10 mg. of a steroid compound selected from the group consisting of a compound having the formula:

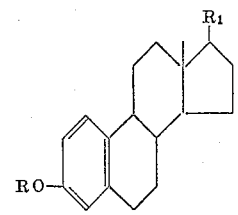

where $R_1$ is selected from the group consisting of a keto group, a β-hydroxy group, a β-acyloxy group derived from a lower alkanoic acid, a β-hydroxy α-alkyl grouping in which the alkyl group contains from one to three carbon atoms, a β-acyloxy α-alkyl grouping in which the acyloxy group is derived from a lower alkanoic acid and the alkyl group contains from one to three carbon atoms, a β-hydroxy α-ethynyl grouping, a β-acyloxy α-ethynyl grouping in which the acyloxy group is derived from a lower alkanoic acid and R is a member selected from the group consisting of cyclopentyl and cyclopentenyl radicals, and a compound having the formula

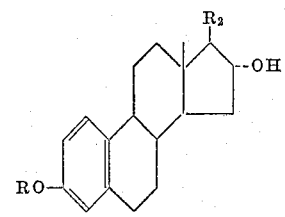

where R has the same meaning as above, and $R_2$ is selected from the group consisting of α- and β-hydroxy groups.

9. A composition as claimed in claim 8 containing from 0.01 mg. to 5 mg. of said steroid compound.

10. A composition as claimed in claim 8 in which said carrier includes an orally acceptable vegetable oil.

11. A composition as claimed in claim 10 which also includes an androgenic hormone selected from the group consisting of the 3-hexyl enol ether of 17α-methyltestosterone and the 3-cyclopentyl enol ether of 17α-methyltestosterone.

12. A composition as claimed in claim 11 in which said compound is the 3-cyclopentyl enol ether of estradiol, and said androgenic hormone is the 3-cyclopentyl enol ether of 17α-methyltestosterone.

13. A composition as claimed in claim 8 which also includes a 3-cyclopentyl enol ether of a progestational hormone selected from the group consisting of progesterone, 17α-acetoxy progesterone and 17α-ethynyl 19-nortestosterone acetate.

14. A composition as claimed in claim 11 which also includes a 3-cyclopentyl enol ether of a progestational hormone selected from the group consisting of progesterone, 17α-acetoxy progesterone and 17α-ethynyl 19-nortestosterone acetate.

15. A process of carrying out estrogenic therapy for a human patient comprising administering daily to said patient from 0.001 mg. to 30 mg. of a steroid compound selected from the group consisting of a compound having the formula

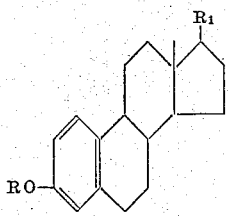

where $R_1$ is selected from the group consisting of a keto group, a β-hydroxy group, a β-acyloxy group derived from a lower alkanoic acid, a β-hydroxy α-alkyl grouping in which the alkyl group contains from one to three carbon atoms, a β-acyloxy α-alkyl grouping in which the acyloxy group is derived from a lower alkanoic acid and the alkyl group contains from one to three carbon atoms, a β-hydroxy α-ethynyl grouping, a β-acyloxy α-ethynyl grouping in which the acyloxy group is derived from a lower alkanoic acid and R is a member selected from the group consisting of cyclopentyl and cyclopentenyl radicals, and a compound having the formula

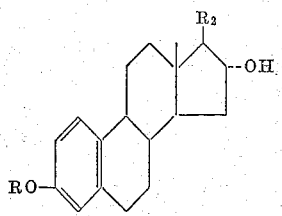

where R has the same meaning as above, and $R_2$ is selected from the group consisting of α- and β-hydroxy groups.

16. A process as claimed in claim 15 in which there is daily administered from 0.01 mg. to 10 mg. of said steroid compound.

References Cited in the file of this patent
UNITED STATES PATENTS
2,949,476    Tyner _____ Aug. 16, 1960